US012573560B2

(12) United States Patent
Jung et al.

(10) Patent No.: US 12,573,560 B2
(45) Date of Patent: Mar. 10, 2026

(54) COMPOSITE ELECTRONIC COMPONENT

(71) Applicant: SAMSUNG ELECTRO-MECHANICS CO., LTD., Suwon-si (KR)

(72) Inventors: Kyung Moon Jung, Suwon-si (KR); Seong Hwan Park, Suwon-si (KR); Dong Hyeon Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 185 days.

(21) Appl. No.: 18/243,928

(22) Filed: Sep. 8, 2023

(65) Prior Publication Data

US 2024/0212939 A1 Jun. 27, 2024

(30) Foreign Application Priority Data

Dec. 22, 2022 (KR) ........................ 10-2022-0181280

(51) Int. Cl.
| | |
|---|---|
| *H01G 4/30* | (2006.01) |
| *H01G 4/012* | (2006.01) |
| *H01G 4/12* | (2006.01) |
| *H01G 4/248* | (2006.01) |

(52) U.S. Cl.
CPC .............. *H01G 4/30* (2013.01); *H01G 4/012* (2013.01); *H01G 4/1218* (2013.01); *H01G 4/248* (2013.01)

(58) Field of Classification Search
CPC ........ H01G 4/30; H01G 4/012; H01G 4/1218; H01G 4/248
See application file for complete search history.

(56) References Cited

U.S. PATENT DOCUMENTS

| | | | |
|---|---|---|---|
| 10,128,050 B1* | 11/2018 | Park ....................... | H05K 1/111 |
| 2008/0239626 A1 | 10/2008 | Yoshizawa | |
| 2015/0122534 A1* | 5/2015 | Park ....................... | H01G 2/065 |
| | | | 174/260 |
| 2016/0007446 A1* | 1/2016 | Ishikawa .................. | H01G 4/12 |
| | | | 361/301.4 |

(Continued)

FOREIGN PATENT DOCUMENTS

| | | |
|---|---|---|
| JP | 2008-243971 A | 10/2008 |
| KR | 10-2019-0045748 A | 5/2019 |
| KR | 10-2020-0080208 A | 7/2020 |

*Primary Examiner* — Michael P Mcfadden
(74) *Attorney, Agent, or Firm* — Morgan Lewis & Bockius LLP

(57) ABSTRACT

A multilayer ceramic capacitor includes a body including a dielectric layer and first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction, and first and second external electrodes respectively disposed on the third and fourth surfaces, and a ceramic chip including a ceramic substrate and first and second terminal electrodes disposed on the ceramic substrate and respectively connected to the first and second external electrodes, the ceramic chip disposed on the first surface of the body. The ceramic substrate includes $Mg_2SiO_4$.

15 Claims, 9 Drawing Sheets

(56)  References Cited

U.S. PATENT DOCUMENTS

2019/0066918 A1*  2/2019  Jeong ..................... H01G 4/005
2020/0328518 A1*  10/2020  Park ..................... H01Q 21/065
2021/0202174 A1*  7/2021  Kim ........................ H01G 4/30

* cited by examiner

FIRST
DIRECTION

SECOND
DIRECTION

I–I'

COMPOSITE ELECTRONIC COMPONENT

CROSS-REFERENCE TO RELATED APPLICATION(S)

This application claims benefit of priority to Korean Patent Application No. 10-2022-0181280 filed on Dec. 22, 2022 in the Korean Intellectual Property Office, the disclosure of which is incorporated herein by reference in its entirety.

TECHNICAL FIELD

The present disclosure relates to a composite electronic component.

A multilayer ceramic capacitor (MLCC), a multilayer electronic component, is a chip-type condenser mounted on the printed circuit boards of various types of electronic products such as imaging devices, including a liquid crystal display (LCD) and a plasma display panel (PDP), computers, smartphones, and mobile phones, and serves to charge or discharge electricity therein or therefrom.

The multilayer ceramic capacitor may be used as a component of various electronic devices due to having a small size, ensuring high capacity and being easily mounted. With the miniaturization and high output power of various electronic devices such as computers and mobile devices, demand for miniaturization and implementation of high capacitance of multilayer ceramic capacitors has also been increasing.

The multilayer ceramic capacitor may have a structure in which a plurality of dielectric layers and internal electrodes having different polarities are alternately stacked between the dielectric layers. The dielectric layer may have piezoelectric and electrostrictive properties. Thus, when a DC or AC voltage is applied to the multilayer ceramic capacitor, a piezoelectric phenomenon may occur between the internal electrodes, resulting in vibrations.

Such vibrations may be transferred to the printed circuit board on which the multilayer ceramic capacitor is mounted through an external electrode of the multilayer ceramic capacitor, thereby generating vibration sound. The vibrating sound may correspond to an audible frequency in the range of 20 to 20,000 Hz, which is unpleasant to humans, and the vibration sound unpleasant to humans is referred to as acoustic noise.

Recently, electronic devices have been used in environments with high voltage and large voltage variations, and accordingly the acoustic noise appears on a level that can be fully recognized by users. Thus, demand for new products with reduced acoustic noise continuously occurs.

In the related art, a composite electronic component having an $Al_2O_3$ substrate attached to a lower surface of a multilayer ceramic capacitor has been used to reduce acoustic noise. The $Al_2O_3$ substrate attached to the lower surface of the multilayer ceramic capacitor may reduce acoustic noise, but the internal stress of the multilayer ceramic capacitor may increase due to a difference in coefficient of thermal expansion between the $Al_2O_3$ substrate and the dielectric layer. When the internal stress of the multilayer ceramic capacitor increases, cracks may occur in the multilayer ceramic capacitor, such that burnt defects or the like may occur, resulting in fatal reliability failures.

Therefore, there is a need for research into structures and materials of a substrate capable of improving the reliability of composite electronic components by suppressing a side effect of increasing the internal stress of multilayer ceramic capacitors while reducing acoustic noise through a substrate attached to the lower surface of the multilayer ceramic capacitor.

SUMMARY

An aspect of the present disclosure provides a composite electronic component having reduced acoustic noise.

Another aspect of the present disclosure provides a composite electronic component having excellent reliability by reducing internal stress applied to a multilayer ceramic capacitor.

However, the aspects of the present disclosure are not limited to those set forth herein, and will be more easily understood in the process of describing specific example embodiments of the present disclosure.

According to an aspect of the present disclosure, there is provided a multilayer ceramic capacitor including a body including a dielectric layer and first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction, and first and second external electrodes respectively disposed on the third and fourth surfaces, and a ceramic chip including a ceramic substrate and first and second terminal electrodes disposed on the ceramic substrate and respectively connected to the first and second external electrodes, the ceramic chip disposed on the first surface of the body. The ceramic substrate may include $Mg_2SiO_4$.

According to example embodiments of the present disclosure, a composite electronic component may have reduced acoustic noise.

According to example embodiments of the present disclosure, a composite electronic component may have excellent reliability by reducing internal stress applied to a multilayer ceramic capacitor.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
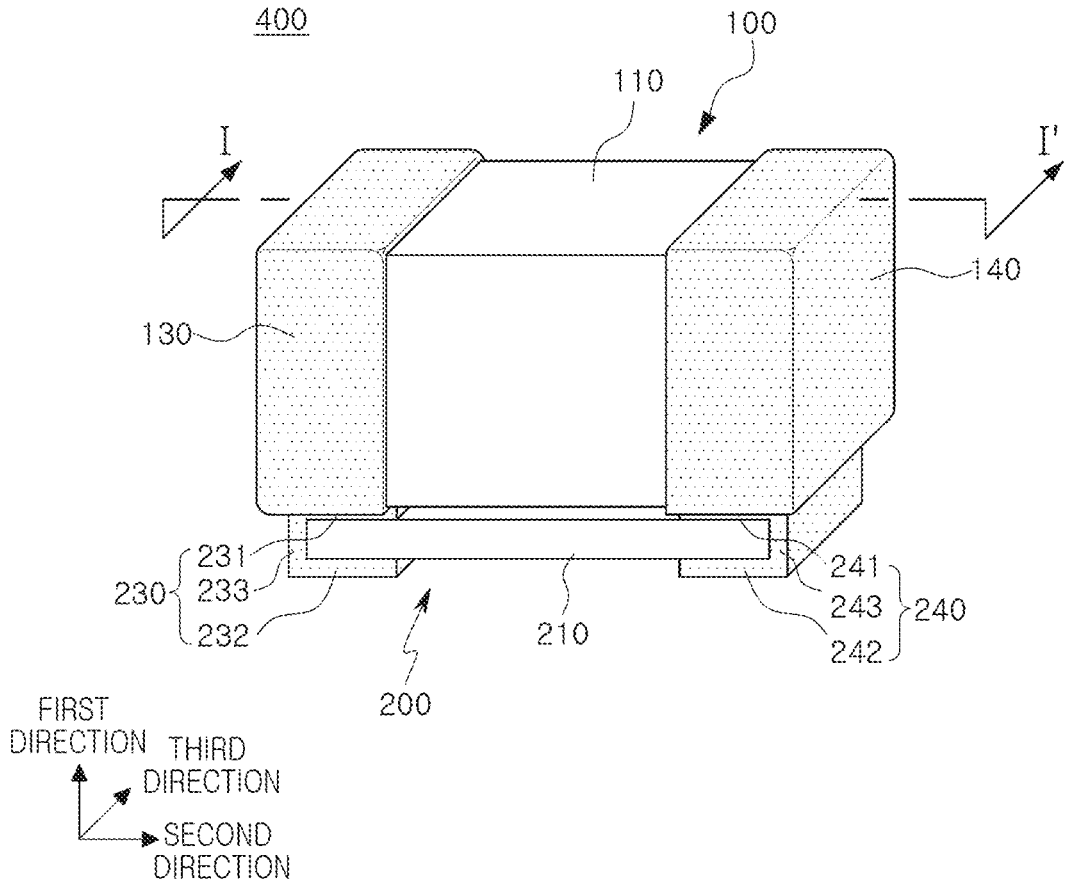
FIG. 1 is a schematic perspective view of a composite electronic component according to an example embodiment of the present disclosure.

Hereinafter, example embodiments of the present disclosure are described with reference to the accompanying drawings. The present disclosure may, however, be exemplified in many different forms and should not be construed as being limited to the specific example embodiments set forth herein. In addition, example embodiments of the present disclosure may be provided for a more complete description of the present disclosure to those skilled in the art. Accordingly, the shapes and sizes of the elements in the drawings may be exaggerated for clarity of description, and elements denoted by the same reference numerals in the drawings may be the same elements.

In order to clearly illustrate the present disclosure, portions not related to the description are omitted, and sizes and thicknesses are magnified in order to clearly represent layers and regions, and similar portions having the same functions within the same scope are denoted by similar reference numerals throughout the specification. Throughout the specification, when an element is referred to as "comprising" or "including," it means that it may include other elements as well, rather than excluding other elements, unless specifically stated otherwise.

In the drawings, a first direction may be defined as a thickness (T) direction, a second direction may be defined as a length (L) direction, and a third direction may be defined as a width (W) direction.

FIG. 1 is a schematic perspective view of a composite electronic component according to an example embodiment of the present disclosure.

Figure 2:
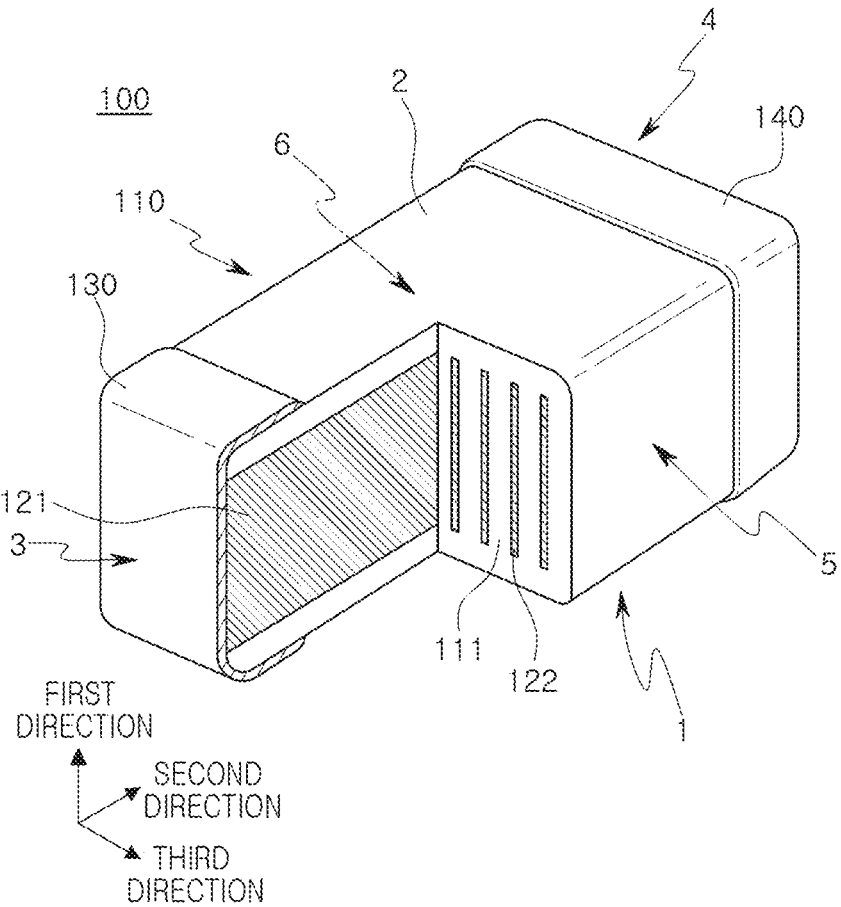
FIG. 2 is a schematic perspective view of a multilayer ceramic capacitor according to an example embodiment of the present disclosure.

FIG. 2 is a schematic perspective view of a multilayer ceramic capacitor according to an example embodiment of the present disclosure.

Figure 3:
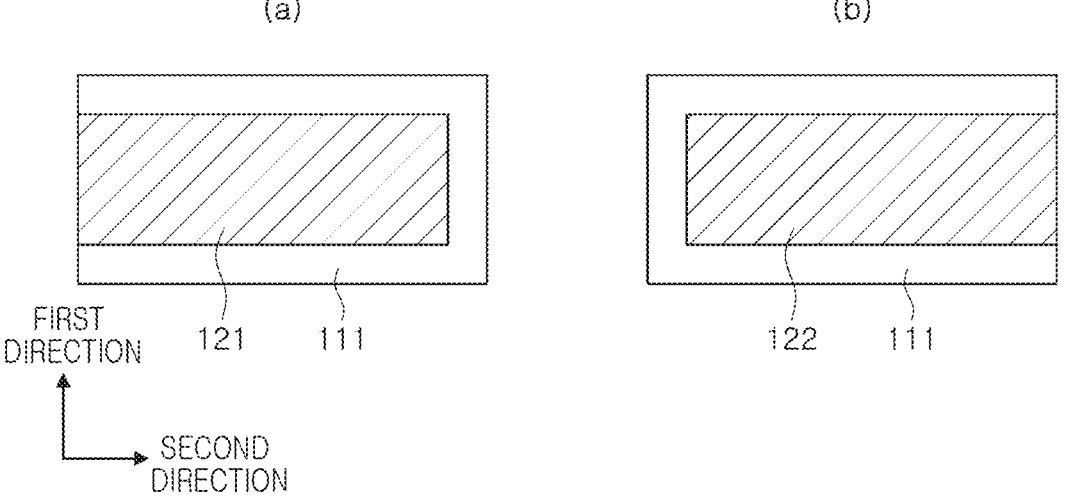
FIG. 3 is a schematic plan view of first and second internal electrodes.

FIG. 3 is a schematic plan view of first and second internal electrodes.

Figure 4:
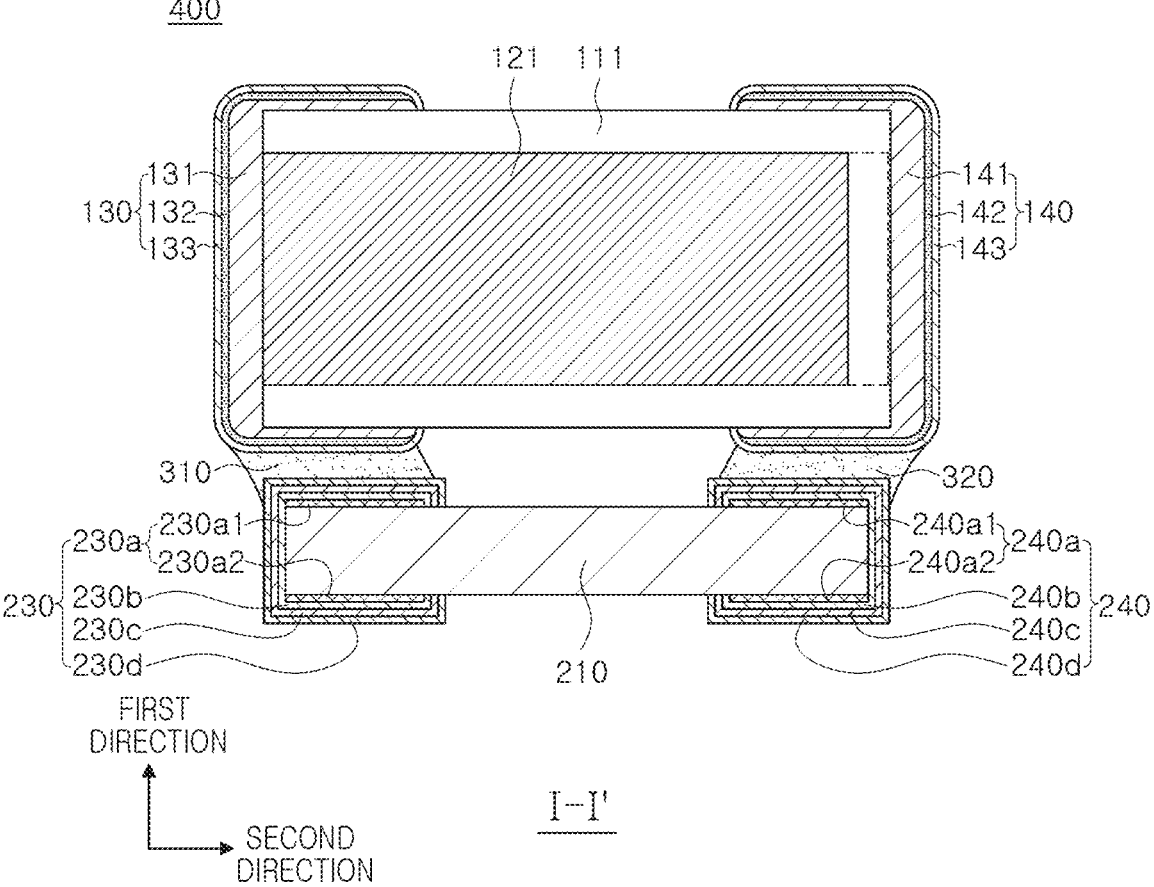
FIG. 4 is a schematic cross-sectional view taken along line I-I' of FIG. 1.

FIG. 4 is a schematic cross-sectional view taken along line I-I' of FIG. 1.

Figure 5:
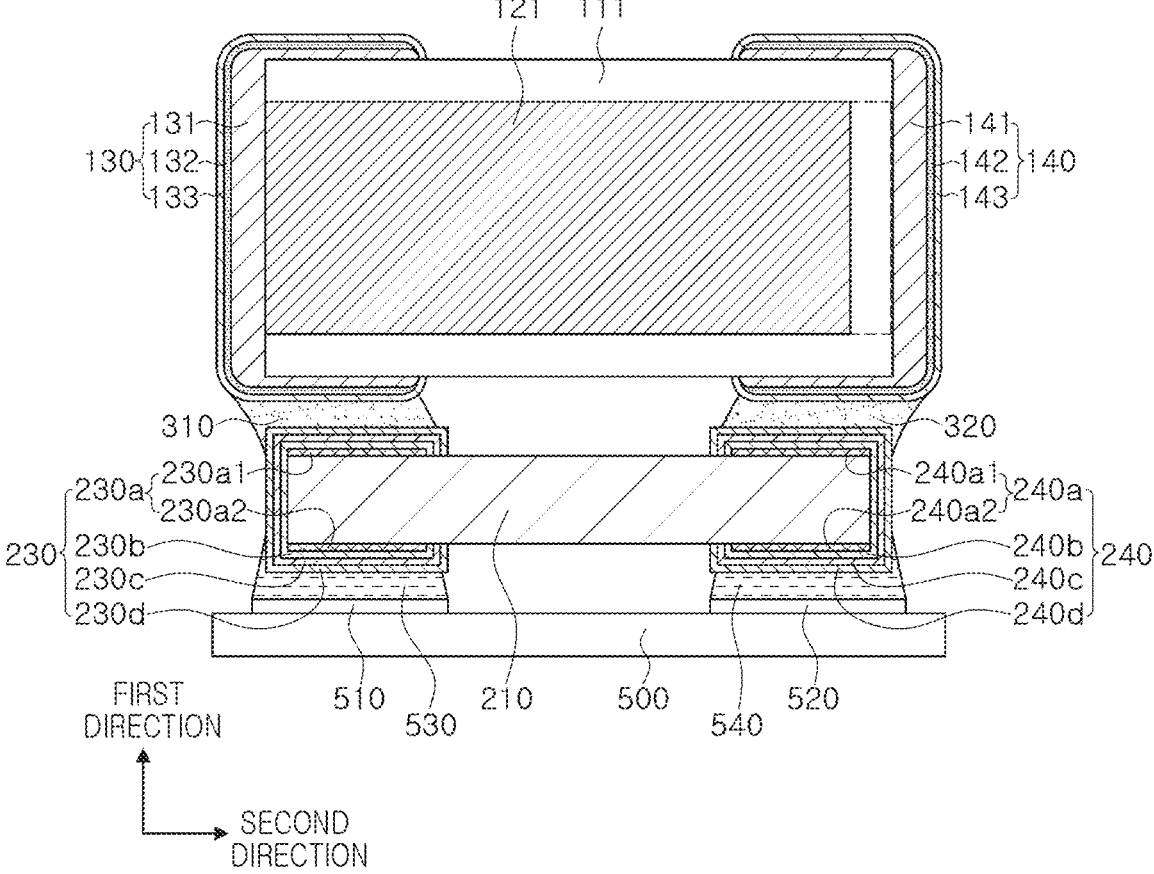
FIG. 5 is a schematic cross-sectional view of a composite electronic component according to an example embodiment of the present disclosure mounted on a printed circuit board.

FIG. 5 is a schematic cross-sectional view of a composite electronic component according to an example embodiment of the present disclosure mounted on a printed circuit board.

Referring to FIGS. 1 to 5, a composite electronic component 400 may include a multilayer ceramic capacitor 100 including a body 110 including a dielectric layer 111 and first and second internal electrodes 121 and 122 alternately disposed with the dielectric layer 111 interposed therebetween, the body 110 having first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3, and 4 and opposing each other in a third direction, and first and second external electrodes 130 and 140 respectively disposed on the third and fourth surfaces 3 and 4, and a ceramic chip 200 including a ceramic substrate 210 and first and second terminal electrodes 230 and 240 disposed on the ceramic substrate 210 and respectively connected to the first and second external electrodes 130 and

140, the ceramic chip 200 disposed on the first surface 1 of the body 110. The ceramic substrate 210 may include $Mg_2SiO_4$.

According to an example embodiment of the present disclosure, the ceramic chip 200 may be disposed on first surface 1 of the body 110 opposing a mounting direction to absorb vibrations transferred from the multilayer ceramic capacitor 100 to the printed circuit board 500, thereby reducing acoustic noise.

In addition, the ceramic substrate 210 of the ceramic chip 200 may include $Mg_2SiO_4$, internal stress applied to the multilayer ceramic capacitor 100 may be minimized by a difference between a coefficient of thermal expansion of the ceramic substrate 210 and a coefficient of thermal expansion of the dielectric layer 111, thereby improving the reliability of the composite electronic component 400.

Hereinafter, respective components included in the composite electronic component 400 according to an example embodiment of the present disclosure will be described in more detail.

First, the multilayer ceramic capacitor 100 included in the composite electronic component 400 according to an example embodiment of the present disclosure will be described with reference to FIGS. 1 to 5.

The multilayer ceramic capacitor 100 may include the body 110 including the dielectric layer 111 and the first and second internal electrodes 121 and 122 alternately disposed with the dielectric layer 111 interposed therebetween, and first and second external electrodes 130 and 140 respectively disposed on the third and fourth surfaces 3 and 4 of the body 110.

A specific shape of the body 110 is not particularly limited. However, as illustrated, the body 110 may have a hexahedral shape or a shape similar thereto. During a sintering process, ceramic powder included in the body 110 may be shrunken, such that the body 110 may not have a perfectly straight hexahedral shape, but may have a substantially hexahedral shape.

The body 110 may have the first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3, and 4 and opposing each other in the third direction.

In the body 110, the dielectric layer 111 and the internal electrodes 121 and 122 may be alternately stacked. A plurality of dielectric layers 111 included in the body 110 may be in a sintered state, and adjacent dielectric layers 111 may be integrated with each other such that boundaries therebetween are not readily apparent without using a scanning electron microscope (SEM).

A raw material included in the dielectric layer 111 is not limited as long as sufficient capacitance is obtainable therewith. The dielectric layer 111 may include, for example, $BaTiO_3$. The dielectric layer 111 may be formed by preparing a ceramic slurry including, for example, $BaTiO_3$ powder, an organic solvent, and a binder, coating a carrier film with the slurry and drying the slurry coated on the carrier film to prepare the ceramic green sheet, and sintering the ceramic green sheet.

An average thickness of the dielectric layer 111 is not particularly limited, but may be, for example, 10 μm or less. In addition, the average thickness of the dielectric layer 111 may be arbitrarily set depending on a desired property or use. For example, in the case of a high-voltage electronic component, the average thickness of the dielectric layer 111 may be less than 2.8 µm, and in the case of a small-sized IT electronic component, the average thickness of the dielectric layer 111 may be 0.4 µm or less to achieve miniaturization and implement high capacitance. However, the present disclosure is not limited thereto.

In general, as the dielectric layer 111 becomes thinner, cracks may easily occur in the body 110 due to stress generated when a voltage is applied, and thus the composite electronic component may have lowered reliability. Conversely, in the case of a composite electronic component according to an example embodiment of the present disclosure, the ceramic substrate 210 may include $Mg_2SiO_4$, thereby minimizing the internal stress applied to the multilayer ceramic capacitor 100. As a result, even when an average thickness td of the dielectric layer 111 is less than 2.8 µm or 0.4 µm or less, the reliability of the composite electronic component may be secured.

The average thickness of the dielectric layer 111 may be a size in the third direction of the dielectric layer 111 interposed between the internal electrodes 121 and 122. The average thickness of the dielectric layer 111 may be measured by scanning, with an SEM, a cross-section of the body 110 in the first and third directions at a magnification of 10,000. More specifically, the average thickness may be an average value of thicknesses of one dielectric layer 111, measured at thirty points equally spaced apart from each other in the first direction. In addition, when such average value measurement is performed on ten dielectric layers 111, the average thickness of the dielectric layer 111 may be further generalized.

The internal electrodes 121 and 122 may be disposed alternately with the dielectric layer 111. For example, the first internal electrode 121 and the second internal electrode 122, a pair of electrodes having different polarities, may be disposed to oppose each other with the dielectric layer 111 interposed therebetween. The first internal electrode 121 and the second internal electrode 122 may be electrically isolated from each other by the dielectric layer 111 interposed therebetween.

The first internal electrode 121 may be disposed to be spaced apart from the fourth surface 4 and to be connected to the third surface 3. In addition, the second internal electrode 122 may be disposed to be spaced apart from the third surface 3 and to be connected to the fourth surface 4.

In an example embodiment, the first and second internal electrodes 121 and 122 may be alternately disposed in the third direction with the dielectric layer 111 interposed therebetween. In general, when a voltage is applied to the multilayer ceramic capacitor 100, the body 110 may be repeatedly expanded and contracted in the first to third directions by an inverse piezoelectric effect of the dielectric layer 111.

When an amount of displacement of a surface in the second and third directions (L-W surface) of the body 110, an amount of displacement of a surface in the first and third directions (W-T surface) of the body 110, and an amount of displacement of a surface in the first and second directions (L-T surface) of the body 110 are measured using a laser doppler vibrometer (LDV), the amounts of displacement may decrease in the order of the surface in the second and third directions, the surface in the first and third directions, and the surface in the first and second directions.

The surface in the first and second directions have a relatively area larger than that of the surface in the first and third direction, and thus it is expected that a relatively small degree of deformation occurs as stress having a similar magnitude is distributed over the large area.

Accordingly, the first and second internal electrodes 121 and 122 may be alternately disposed in the third direction with the dielectric layer 111 interposed therebetween, thereby minimizing vibrations generated in the multilayer ceramic capacitor 100 transferred to the ceramic chip 200. Thus, acoustic noise of the composite electronic component 400 may be more effectively reduced.

A conductive metal included in the internal electrodes 121 and 122 may be one or more of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

The internal electrodes 121 and 122 may be formed by printing a conductive paste for internal electrodes including a conductive metal to a predetermined thickness on a ceramic green sheet, and then performing sintering thereon. A method of printing the conductive paste may include a screen-printing method, a gravure-printing method, or the like, but the present disclosure is not limited thereto An average thickness of each of the internal electrodes 121 and 122 is not particularly limited, but may be, for example, 3 µm or less. In addition, the average thickness of the internal electrodes 121 and 122 may be arbitrarily set depending on a desired property or use. For example, in the case of a high-voltage electronic component, the average thickness of the internal electrodes 121 and 122 may be less than 1 µm, and in the case of a small-sized IT electronic component, the average thickness of the internal electrodes 121 and 122 may be 0.4 µm or less to achieve miniaturization and implement high capacitance. However, the present disclosure is not limited thereto.

In the case of a composite electronic component according to an example embodiment of the present disclosure, the ceramic substrate 210 may include $Mg_2SiO_4$, such that the reliability of the multilayer electronic component may be secured, even when the average thickness of the internal electrodes 121 and 122 is less than 1 µm or 0.4 µm or less.

The average thickness of the internal electrodes 121 and 122 may be a size of each of the internal electrodes 121 and 122 in the third direction. The average thickness of the internal electrodes 121 and 122 may be measured by scanning, with an SEM, a cross-section of the body 110 in the first and third directions at a magnification of 10,000. More specifically, the average thickness may be an average value of thicknesses of one internal electrode 121 or 122, measured at thirty points equally spaced apart from each other in the first direction. In addition, when such average value measurement is performed on ten internal electrodes 121 and 122, the average thickness of each of the internal electrodes 121 and 122 may be further generalized.

The external electrodes 130 and 140 may be disposed on the third and fourth surfaces 3 and 4 of the body 110, and may extend onto portions of the first, second, fifth and sixth surfaces 1, 2, 5, and 6. In addition, the external electrodes 130 and 140 may include a first external electrode 130 disposed on the third surface 3 to be connected to the first internal electrode 121, and a second external electrode 140 disposed on the fourth surface 4 to be connected to the second internal electrode 122.

The first external electrode 130 may be connected to the first terminal electrode 230 of the ceramic chip 200 through a portion thereof disposed to extend to a portion of the first surface 1 of the body 110. In addition, the second external electrode 140 may be connected to the second terminal electrode 240 of the ceramic chip 200 through a portion thereof disposed to extend to a portion of the first surface 1 of the body 110.

The first external electrode 130 may include, for example, a first base electrode layer 131 connected to the first internal electrode 121, a first Ni plating layer 132 disposed on the first base electrode layer 131, and a first Sn plating layer 133 disposed on the first Ni plating layer 132.

The second external electrode 140 may include, for example, a second base electrode layer 141 connected to the second internal electrode 122, a second Ni plating layer 142 disposed on the second base electrode layer 141, and a second Sn plating layer 143 disposed on the second Ni plating layer 142.

The first and second base electrode layers 131 and 141 may be formed by dipping the third and fourth surfaces 3 and 4 of the body 110 in a conductive paste for external electrodes including a conductive metal and glass, and then performing sintering thereon. Alternatively, the first and second base electrode layers 131 and 141 may be formed by transferring a sheet including a conductive metal and glass, and then performing sintering thereon.

The conductive metal included in the first and second base electrode layers 131 and 141 may include copper (Cu), nickel (Ni), palladium (Pd), platinum (Pt), gold (Au), silver (Ag), lead (Pb), and/or an alloy including the same, and more preferably may include copper (Cu), but the present disclosure is not limited thereto.

Referring to FIGS. 1 to 5, the composite electronic component 400 according to an example embodiment of the present disclosure may include the ceramic chip 200 disposed on the first surface 1 of the body 110.

The ceramic chip 200 may include the ceramic substrate 210 and the first and second terminal electrodes 230 and 240 disposed on the ceramic substrate 210 and connected to the first and second external electrodes 130 and 140, respectively. The composite electronic component 400 according to an example embodiment may include a first solder portion 310 connecting the first external electrode 130 and the first terminal electrode 230 to each other, and a second solder portion 320 connecting the second external electrode 140 and the second terminal electrode 240 to each other.

For example, the first and second solder portions 310 and 320 may include at least one of tin (Sn), antimony (Sb), cadmium (Cd), lead (Pb), zinc (Zn), aluminum (Al), and copper (Cu), but the present disclosure is not limited thereto.

Referring to FIG. 1, in an example embodiment, the ceramic substrate 210 may have one surface and the other surface opposing each other in the first direction. The first terminal electrode 230 may include a first connection portion 231 disposed on the one surface and connected to the first external electrode 130, and a first mounting portion 232 disposed on the other surface. The second terminal electrode 240 may include a second connection portion 241 disposed on the one surface and connected to the second external electrode 140, and a second mounting portion 242 disposed on the other surface.

In addition, the first terminal electrode 230 may include a first connection portion 233 disposed on one side surface of the ceramic substrate 210 to connect the first connection portion 231 and the first mounting portion 232, and the second terminal electrode 240 may include a second connection portion 243 disposed on one side surface of the ceramic substrate 210 to connect the second connection portion 241 and the second mounting portion 242, but the present disclosure is not limited thereto. For example, the first connection portion 231 and the first mounting portion 232 may be connected to each other through a first via electrode penetrating the ceramic substrate 210 in the first direction, and the second connection portion 241 and the second mounting portion 242 may be connected to each other through a second via electrode penetrating the ceramic substrate 210 in the first direction.

Referring to FIG. 4, in an example embodiment, the first terminal electrode 230 may include a first electrode layer 230a disposed on the ceramic substrate 210 and a 1-1-th plating layer 230b, a 1-2-th plating layer 230c, and a 1-3-th plating layer 230d sequentially stacked on the first electrode layer, and the second terminal electrode 240 may include a second electrode layer 240a disposed on the ceramic substrate 210 and a 2-1-th plating layer 240b, a 2-2-th plating layer 240c, and a 2-3-th plating layer 240d sequentially stacked on the second electrode layer.

The first electrode layer 230a may include, among one surface and the other surface of the ceramic substrate 210 opposing each other in the first direction, a 1-1-th electrode layer 230a1 disposed on the one surface of the ceramic substrate and a 1-2-th electrode layer 230a2 disposed on the other surface of the ceramic substrate 210. In addition, the second electrode layer 240a may include a 2-1-th electrode layer 240a1 disposed on the one surface of the ceramic substrate and a 2-2-th electrode layer 240a2 disposed on the other surface of the ceramic substrate 210. In addition, the 1-1-th plating layer 230b may be disposed on one side surface of the ceramic substrate 210 to extend onto the 1-1-th electrode layer 230a1 and the 1-2-th electrode layer 230a2, and the 2-1-th plating layer 240b may be disposed on the one side surface of the ceramic substrate 210 to extend onto the 2-1-th electrode layer 240a1 and the 2-2-th electrode layer 240a2, but the present disclosure is not limited thereto.

In an example embodiment, the first and second electrode layers 230a and 240a each include Cu and a resin. The 1-1-th plating layer 230b and the 2-1-th plating layer 240b each include Cu. The 1-2-th plating layer 230c and the 2-2-th plating layer 240c may each include Ni. The 1-3-th plating layer 230d and the 2-3-th plating layer 240d may each include Sn.

The first electrode layer 230a and the second electrode layer 240a each including Cu and a resin may suppress transfer of stress to the multilayer ceramic capacitor 100, thereby preventing cracks from occurring in the multilayer ceramic capacitor 100. The 1-1-th plating layer 230b and the 2-1-th plating layer 240b each including Cu may more effectively suppress discontinuation of plating. The 1-2-th plating layer 230c and the 2-2-th plating layer 240c each including Ni may improve bonding strength with the 1-1-th plating layer and the 2-1-th plating layer. The 1-3-th plating layer 230d and the 2-3-th plating layer 240d each including Sn may improve mounting properties.

Referring to FIG. 5, a printed circuit board 500 on which a composite electronic component according to an example embodiment of the present disclosure is mounted may include a first electrode pad 510 and a second electrode pad 520 on one surface thereof, and the first and second electrode pads 510 and 520 may be electrically connected to the first and second terminal electrodes 230 and 240 through a first solder 530 and a second solder 540, respectively.

When voltages having different polarities are applied to the first and second external electrodes 130 and 140 in a state in which the composite electronic component is mounted on the printed circuit board 500, the body 110 may be repeatedly expanded and contracted in the first direction by the reverse piezoelectric effect of the dielectric layer 111, thereby generating vibrations. Such vibrations may be transferred to the printed circuit board, such that acoustic noise may be generated.

According to an example embodiment of the present disclosure, the ceramic chip 200 may be disposed on the first surface 1 toward a mounting direction of the multilayer ceramic capacitor 100 to absorb vibrations transferred from the multilayer ceramic capacitor 100 to the printed circuit board 500, thereby reducing acoustic noise.

In an example embodiment, a size of the ceramic chip 200 in the second direction may be smaller than a size of the multilayer ceramic capacitor 100 in the second direction. In addition, in an example embodiment, a size of the ceramic chip 200 in the third direction may be smaller than a size of the multilayer ceramic capacitor 100 in the third direction.

When the size of the ceramic chip 200 in the second direction and/or the size of the ceramic chip 200 in the third direction is smaller than that of the multilayer ceramic capacitor 100, a step may be generated between the multilayer ceramic capacitor 100 and the ceramic chip 200. When the composite electronic component is mounted to a printed circuit board, the step may act as a solder pocket filled with a solder to reduce a height of the solder. As a result, an effect of reducing acoustic noise may be expected.

According to an example embodiment of the present disclosure, the ceramic substrate 210 may include $Mg_2SiO_4$. More preferably, the ceramic substrate 210 may be formed of $Mg_2SiO_4$. The ceramic substrate 210 including $Mg_2SiO_4$ may minimize internal stress caused by a difference between a coefficient of thermal expansion of the ceramic substrate 210 and a coefficient of thermal expansion of the dielectric layer 111, thereby improving the reliability of the composite electronic component 400.

As described above, in the related art, an $Al_2O_3$ substrate was attached to a lower surface of a multilayer ceramic capacitor in order to reduce acoustic noise. However, when the $Al_2O_3$ substrate was attached to the lower surface of the multilayer ceramic capacitor, a composite electronic component was reflow-mounted on a printed circuit board and then was cooled to room temperature. In this case, internal stress applied to the composite electronic component increased due to a difference between a coefficient of thermal expansion thereof and a coefficient of thermal expansion of a dielectric layer.

Figure 6:
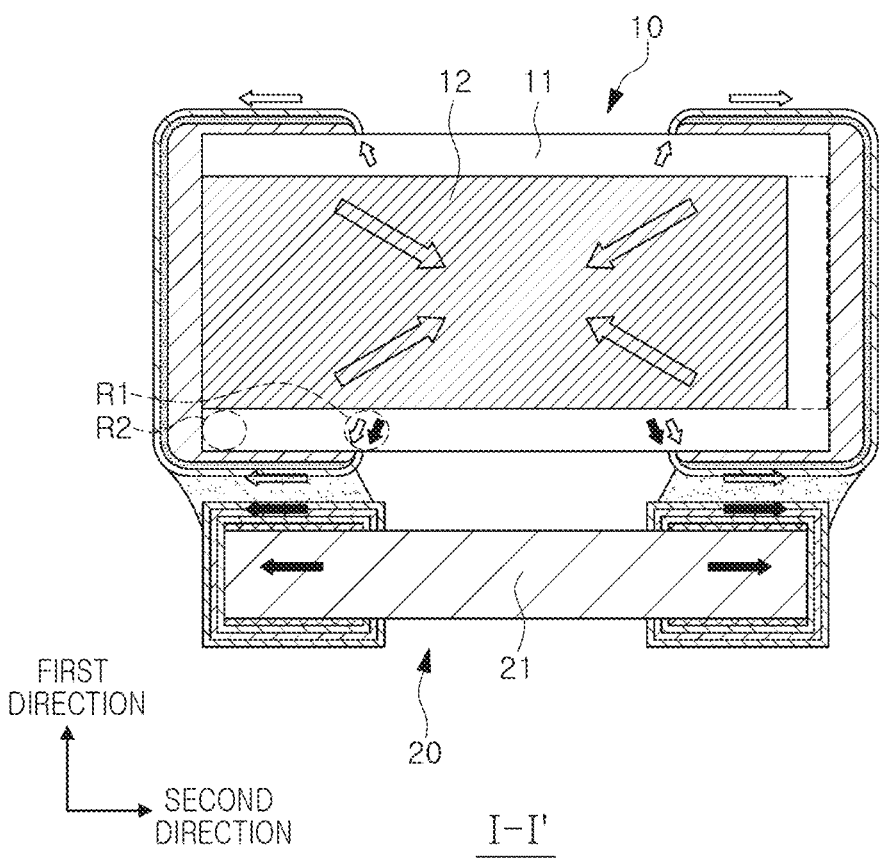
FIG. 6 is a schematic cross-sectional view of internal stress generated when a composite electronic component according to the related art is reflow-mounted on a printed circuit board and then cooled to room temperature.

FIG. 6 is a schematic cross-sectional view of internal stress generated when a composite electronic component according to the related art is reflow-mounted on a printed circuit board and then cooled to room temperature. Internal stress caused by a configuration of a multilayer ceramic capacitor 10 is indicated by a hollow arrow in FIG. 6, and internal stress caused by a configuration of the ceramic chip 20 is indicated by a black arrow in FIG. 6.

Referring to FIG. 6, a first internal electrode 12 of the multilayer ceramic capacitor 10 may have a relatively high coefficient of thermal expansion as compared to a dielectric layer 11. Thus, when the composite electronic component is reflow-mounted and then cooled to room temperature, the first internal electrode 12 may have a behavior of contracting toward a central portion thereof. In addition, an external electrode may have a relatively high coefficient of thermal expansion as compared to a dielectric layer, and thus an end of the external electrode may have a behavior of pulling the dielectric layer 11.

An $Al_2O_3$ substrate 21 of the ceramic chip 20 according to the related art may have, example, a relatively low coefficient of thermal expansion as compared to the dielectric layer 11 including $BaTiO_3$. When the composite electronic component is reflow-mounted and then cooled to room temperature, the $Al_2O_3$ substrate 21 may have a behavior of relatively expanding and pulling the dielectric layer 11.

Accordingly, when the $Al_2O_3$ substrate 21 according to the related art is applied, the internal stress acting on a region R1 of a first surface of a body adjacent to the end of the external electrode may overlap in the same direction. Thus, cracks may occur in the region R1 of the first surface of the body adjacent to the end of the external electrode, resulting in a decrease in reliability of the composite electronic component.

Figure 7:
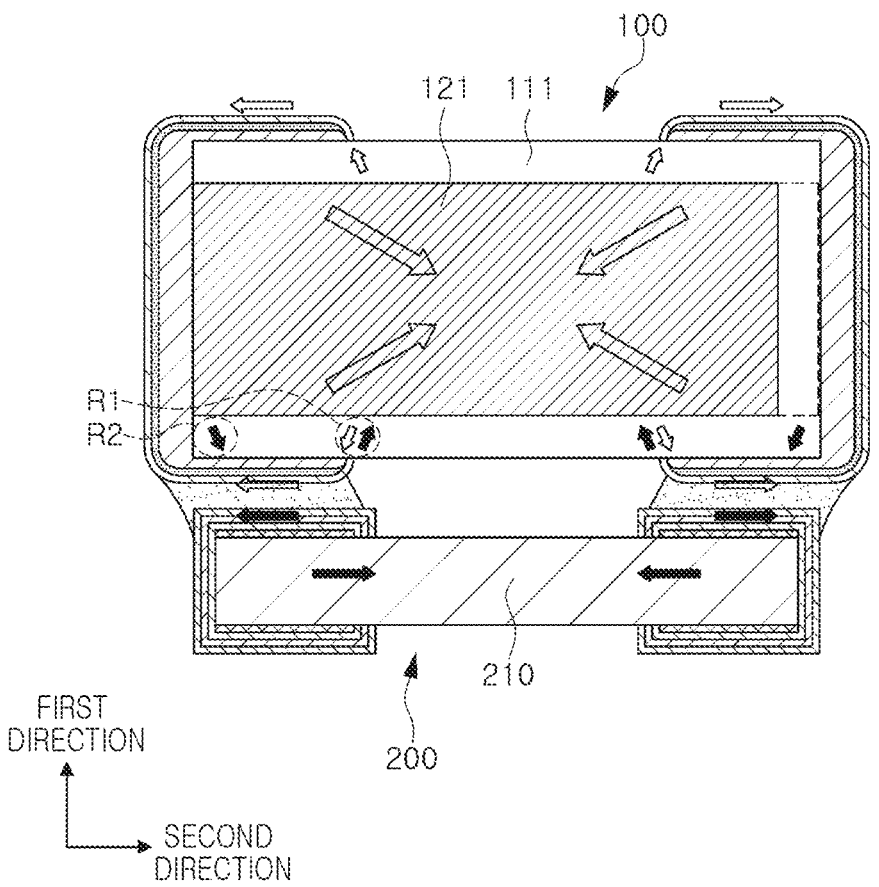
FIG. 7 is a schematic cross-sectional view of internal stress generated when a composite electronic component according to an example embodiment of the present disclosure is reflow-mounted on a printed circuit board and then cooled to room temperature.

FIG. 7 is a schematic cross-sectional view of internal stress generated when a composite electronic component according to an example embodiment of the present disclosure is reflow-mounted on a printed circuit board and then cooled to room temperature. Internal stress caused by a configuration of a multilayer ceramic capacitor 100 is indicated by a hollow arrow in FIG. 7, and internal stress caused by a configuration of the ceramic chip 200 is indicated by a black arrow in FIG. 7.

Referring to FIG. 7, the ceramic substrate 210 including $Mg_2SiO_4$ may have a relatively high coefficient of thermal expansion as compared to the dielectric layer 111 including, for example, $BaTiO_3$. Thus, when the composite electronic component is reflow-mounted and then cooled to room temperature, the ceramic substrate 210 may have a relatively contracting behavior, and accordingly, internal stress applied to a region R1 of a first surface of a body adjacent to an end of an external electrode may be offset, thereby preventing cracks from occurring in the region R1 of the first surface of the body adjacent to the end of the external electrode. As a result, the reliability of the composite electronic component 400 may be further improved.

The ceramic substrate may have a relatively high coefficient of thermal expansion as compared to the dielectric layer. In this case, when the composite electronic component is reflow-mounted and then cooled to room temperature, internal stress applied to a region R2 of the first surface of the body adjacent to an end of the ceramic substrate may increase. As will be described below, the present inventors confirmed that, when the ceramic substrate 210 includes $Mg_2SiO_4$, the internal stress applied to the region R1 of the first surface of the body adjacent to the end of the external electrode and the internal stress applied to the region R2 of the first surface of the body adjacent to the end of the ceramic substrate may be most effectively reduced.

Figure 9:
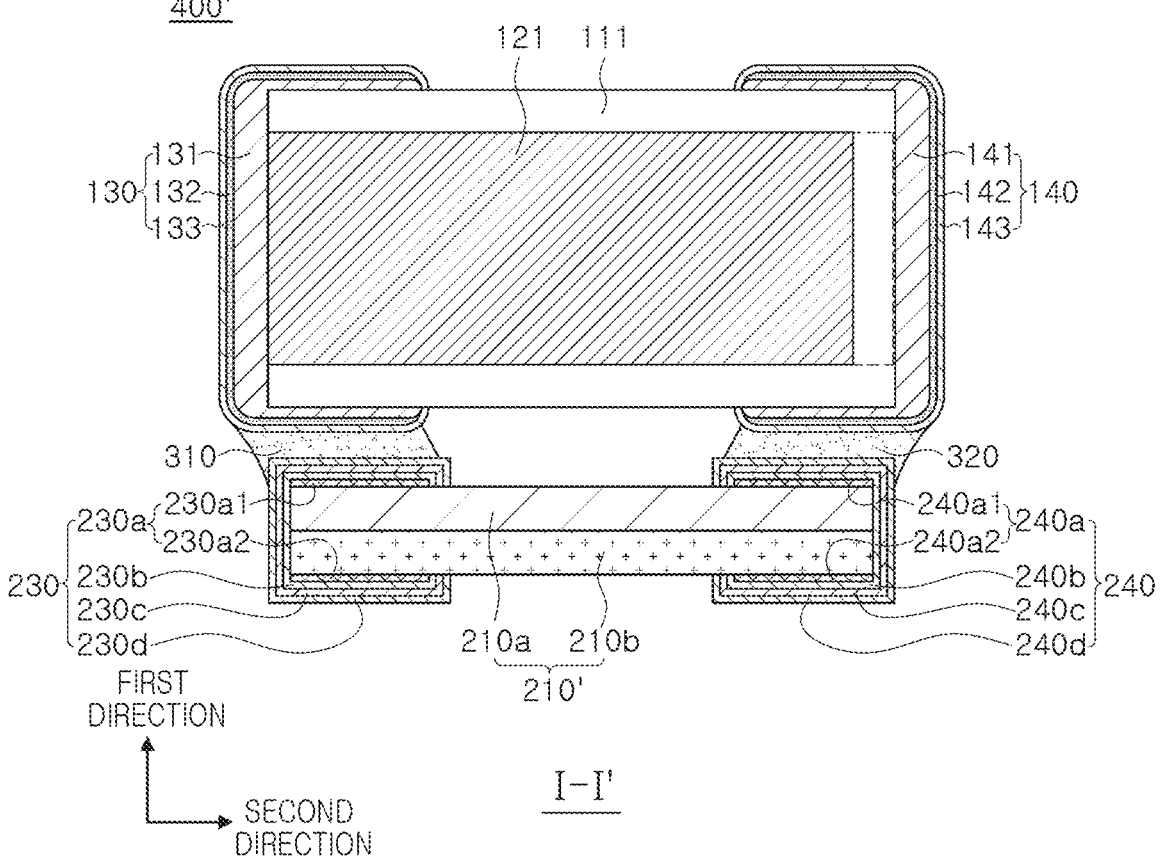
FIG. 9 is a modification of FIG. 4.

FIG. 9 is a modification of FIG. 4. Referring to FIG. 9, a ceramic substrate 210' of a composite electronic component 400' according to an example embodiment of the present disclosure may include a first substrate 210a formed of $Mg_2SiO_4$ and a second substrate 210b made of $Al_2O_3$. In this case, the first substrate 210a and the second substrate 210b may be arranged in the first direction. That is, the first substrate 210a may be disposed on an upper portion or a lower portion of the second substrate 210b in the first direction.

The first substrate 210a formed of $Mg_2SiO_4$ may have a coefficient of thermal expansion relatively higher than that of the dielectric layer 111, and the second substrate 210b formed of $Al_2O_3$ may have a coefficient of thermal expansion relatively lower than that of the dielectric layer 111. Accordingly, internal stress in the first direction generated by the first substrate 210a may have a direction different from that of internal stress in the first direction generated by the second substrate 210b. The internal stress in the first direction generated by the first substrate and the internal stress in the first direction generated by the second substrate may be offset each other. As a result, the occurrence of cracks or the like may be prevented, thereby further improving the reliability of the composite electronic component 400'.

EXPERIMENTAL EXAMPLE

Based on a sample formed of a multilayer ceramic capacitor having a size of 2.0×1.2 mm, the multilayer ceramic capacitor including a body including a dielectric layer and first and second internal electrodes and first and second external electrodes respectively disposed on third and fourth surfaces of the body, and a ceramic chip disposed on the first surface of the body, the ceramic chip including a ceramic substrate and first and second terminal electrodes disposed on the ceramic substrate, internal stress applied to the multilayer ceramic capacitor was measured.

Here, the dielectric layer includes $BaTiO_3$, the internal electrode includes Ni, and the external electrode includes a base electrode layer including Cu, and a Ni plating layer and a Sn plating layer sequentially stacked on the base electrode layer. The internal stress applied to the multilayer ceramic capacitor depending on a coefficient of thermal expansion of the ceramic substrate was measured using ANSYS, a commercial structural analysis program. More specifically, as illustrated in FIG. 7, the internal stress applied to the region R1 of the first surface of the body adjacent to the end of the external electrode and the internal stress applied to the region R2 of the first surface of the body adjacent to the end of the ceramic substrate were measured.

Figure 8:
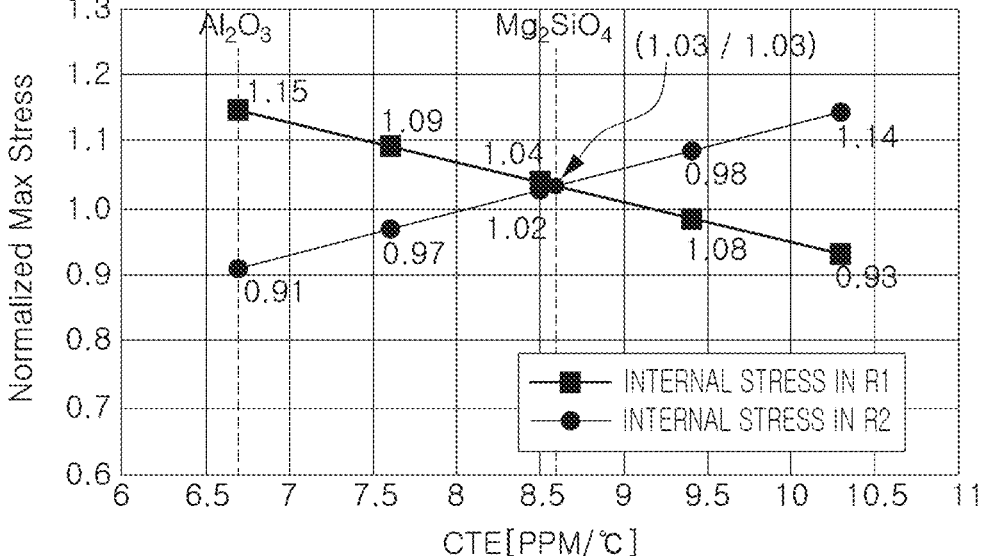
FIG. 8 is a graph illustrating internal stress applied to a multilayer ceramic capacitor depending on a coefficient of thermal expansion of a ceramic substrate.

FIG. 8 is a graph illustrating internal stress applied to a multilayer ceramic capacitor depending on a coefficient of thermal expansion of a ceramic substrate. The normalized maximum stress of FIG. 8 relatively indicates a maximum value of internal stress in R1 and R2 depending on the coefficient of thermal expansion of the ceramic substrate, assuming that a maximum value of the internal stress applied to the multilayer ceramic capacitor is set to 1.0 when the multilayer ceramic capacitor having a lower portion to which a ceramic chip is not attached is reflow-mounted on a printed circuit board and then cooled to room temperature.

Referring to FIG. 8, when the ceramic substrate is formed of $Al_2O_3$ having a coefficient of thermal expansion lower than that of the dielectric layer, it can be confirmed that the internal stress in R1 is excessively high.

It can be confirmed that, as the coefficient of thermal expansion of the ceramic substrate increases, the internal stress in R1 decreases and the internal stress in R2 gradually increases. When the coefficient of thermal expansion of the ceramic substrate is about 8.6 ppm/° C., it can be confirmed that the internal stresses in R1 and R2 in are closest to 1.0, respectively.

Table 1 below shows a coefficient of thermal expansion of a ceramic material having basic stiffness and insulating properties. In this case, the coefficient of thermal expansion indicates a thermal expansion coefficient at 30° C. to 200° C. in consideration of a reflow process and a reduction in temperature to room temperature.

TABLE 1

| Ceramic Material | Ceramic Material Coefficient of Thermal Expansion (ppm/° C.) |
| --- | --- |
| $ZrO_2$ | 9.9 |
| $Mg_2SiO_4$ | 8.7 |
| Steatite | 7.4 |

TABLE 1-continued

| Ceramic Material | Ceramic Material Coefficient of Thermal Expansion (ppm/° C.) |
| --- | --- |
| $Al_2O_3$ | 6.7 |
| Mullite | 5.7 |
| $ZrSiO_4$ | 2.9 |
| Cordierite | 2.3 |

Referring to FIG. 8 and Table 1, it can be confirmed that, when the ceramic substrate is formed of $Mg_2SiO_4$ having a coefficient of thermal expansion closest to about 8.6 ppm/° C., the internal stresses in R1 and R2 will be closest to 1.0, respectively. Accordingly, it can be confirmed that, when the ceramic substrate includes $Mg_2SiO_4$, the internal stress applied to the multilayer ceramic capacitor may be most effectively reduced, thereby providing a composite electronic component having excellent reliability.

The term "an example embodiment" used herein does not refer to the same example embodiment, and is provided to emphasize a particular feature or characteristic different from that of another example embodiment. However, example embodiments provided herein are considered to be able to be implemented by being combined in whole or in part one with one another. For example, one element described in a particular example embodiment, even if it is not described in another example embodiment, may be understood as a description related to another example embodiment, unless an opposite or contradictory description is provided therein.

In addition, the terms "first," "second," and the like may be used to distinguish an element from another element, and may not limit a sequence and/or an importance, or others, in relation to the elements. In some cases, a first element may be referred to as a second element, and similarly, a second element may be referred to as a first element without departing from the scope of the example embodiments.

While example embodiments have been shown and described above, it will be apparent to those skilled in the art that modifications and variations could be made without departing from the scope of the present disclosure as defined by the appended claims.

What is claimed is:
1. A composite electronic component comprising:
 a multilayer ceramic capacitor including a body including a dielectric layer and first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction, and first and second external electrodes respectively disposed on the third and fourth surfaces; and
 a ceramic chip including a ceramic substrate and first and second terminal electrodes disposed on the ceramic substrate and respectively connected to the first and second external electrodes, the ceramic chip disposed on the first surface of the body,
 wherein the ceramic substrate is a $Mg_2SiO_4$ substrate.
2. The composite electronic component of claim 1, wherein the ceramic substrate is formed of $Mg_2SiO_4$.
3. The composite electronic component of claim 1, wherein the dielectric layer includes $BaTiO_3$.

4. The composite electronic component of claim 1, wherein a size of the ceramic chip in the second direction is smaller than a size of the multilayer ceramic capacitor in the second direction.

5. The composite electronic component of claim 1, wherein a size of the ceramic chip in the third direction is smaller than a size of the multilayer ceramic capacitor in the third direction.

6. The composite electronic component of claim 1, wherein the first and second internal electrodes are alternately disposed in the third direction with the dielectric layer interposed therebetween.

7. The composite electronic component of claim 1, wherein the ceramic substrate has one surface and the other surface opposing each other in the first direction, the first terminal electrode includes a first connection portion disposed on the one surface and connected to the first external electrode and a first mounting portion disposed on the other surface, and the second terminal electrode includes a second connection portion disposed on the one surface and connected to the second external electrode and a second mounting portion disposed on the other surface.

8. The composite electronic component of claim 1, wherein the first terminal electrode includes a first electrode layer disposed on the ceramic substrate and a 1-1-th plating layer, a 1-2-th plating layer, and a 1-3-th plating layer sequentially stacked on the first electrode layer, and the second terminal electrode includes a second electrode layer disposed on the ceramic substrate and a 2-1-th plating layer, a 2-2-th plating layer, and a 2-3-th plating layer sequentially stacked on the second electrode layer.

9. The composite electronic component of claim 8, wherein the first electrode layer and the second electrode layer each include Cu and a resin, the 1-1-th plating layer and the 2-1-th plating layer each include Cu, the 1-2-th plating layer and the 2-2-th plating layer each include Ni, and the 1-3-th plating layer and the 2-3-th plating layer each include Sn.

10. The composite electronic component of claim 1, comprising:

a first solder portion connecting the first external electrode and the first terminal electrode to each other, and a second solder portion connecting the second external electrode and the second terminal electrode to each other.

11. The composite electronic component of claim 1, wherein the ceramic substrate includes a first substrate formed of $Mg_2SiO_4$ and a second substrate formed of $Al_2O_3$.

12. The composite electronic component of claim 11, wherein the first substrate and the second substrate are arranged in the first direction.

13. The composite electronic component of claim 1, wherein the ceramic substrate includes a first $Mg_2SiO_4$ substrate and a second $Al_2O_3$ substrate.

14. The composite electronic component of claim 1, wherein an average thickness of the dielectric layer is less than 2.8 μm.

15. The composite electronic component of claim 14, wherein the average thickness of the dielectric layer is 0.4 μm or less.

\* \* \* \* \*